United States Patent
Mühlin

(10) Patent No.: US 7,631,665 B2
(45) Date of Patent: Dec. 15, 2009

(54) DEVICE AND METHOD FOR PIPELINE REHABILITATION

(75) Inventor: Michael Mühlin, Erkelenz (DE)

(73) Assignee: Trelleborg Pipe Seals Duisburg GmbH, Duisburg (DE)

( * ) Notice: Subject to any disclaimer, the term of this patent is extended or adjusted under 35 U.S.C. 154(b) by 407 days.

(21) Appl. No.: 10/947,503

(22) Filed: Sep. 22, 2004

(65) Prior Publication Data

US 2005/0092382 A1    May 5, 2005

(30) Foreign Application Priority Data

Sep. 25, 2003    (DE) .............................. 203 14 914 U
Dec. 4, 2003     (DE) ................................ 103 57 059

(51) Int. Cl.
    *F16L 55/18*    (2006.01)
(52) U.S. Cl. ....................... 138/98; 138/97; 405/150.1; 405/184.2
(58) Field of Classification Search ................. 138/98, 138/97; 405/150.1, 184.2
    See application file for complete search history.

(56) References Cited

U.S. PATENT DOCUMENTS

| | | | |
|---|---|---|---|
| 3,718,978 A * | 3/1973 | Van Koevering et al. ...... 33/544 |
| 5,207,031 A | 5/1993 | Gammelgaard |
| 5,329,063 A * | 7/1994 | Endoh .......................... 138/98 |
| 5,340,160 A * | 8/1994 | Meijers et al. ................. 285/15 |
| 5,393,481 A * | 2/1995 | Wood ......................... 264/516 |
| 5,423,352 A * | 6/1995 | Sigel ........................... 138/98 |
| 5,451,284 A * | 9/1995 | Ikeda et al. .................. 156/247 |
| 5,566,719 A * | 10/1996 | Kamiyama et al. ............. 138/98 |
| 5,598,873 A * | 2/1997 | Kamiyama et al. ............. 138/98 |
| 5,659,915 A | 8/1997 | Dhingra et al. |
| 5,927,341 A | 7/1999 | Taylor |
| 5,950,682 A | 9/1999 | Kiest, Jr. |
| 6,029,726 A * | 2/2000 | Tweedie et al. ............. 156/423 |
| 6,039,079 A * | 3/2000 | Kiest, Jr. ....................... 138/98 |
| 6,068,725 A * | 5/2000 | Tweedie et al. ............. 156/287 |
| 6,152,184 A * | 11/2000 | Kamiyama et al. ............ 138/98 |
| 6,227,764 B1 * | 5/2001 | Einhaus et al. .............. 405/157 |
| 6,484,757 B1 | 11/2002 | Warren |
| 6,641,687 B2 * | 11/2003 | Kiest et al. ..................... 156/94 |
| 7,073,536 B2 * | 7/2006 | Blackmore et al. ............ 138/98 |
| 2006/0174957 A1 * | 8/2006 | Blackmore et al. ............ 138/98 |

FOREIGN PATENT DOCUMENTS

DE         4207038 A1    9/1993

(Continued)

*Primary Examiner*—James F Hook
(74) *Attorney, Agent, or Firm*—Muirhead and Saturnelli, LLC

(57) ABSTRACT

A device and method for rehabilitating pipe connections is disclosed that simplifies the reliable transportation and positioning of a pipe lining relative to a junction region of a building service line to be lined. The device and method provides for rehabilitating the junction of a building connection from a main pipeline into the building service line. With a positioning mechanism, a curable pipe lining may be positioned at the junction of the building service line from the main line and, with a transport mechanism, the positioning mechanism and the pipe lining may be transported to the junction. An alignment body may be arranged so that it may move the transport mechanism and which can be moved into the junction of the building service line. A drive may move the alignment body into the junction of the building service line.

32 Claims, 5 Drawing Sheets

FOREIGN PATENT DOCUMENTS

| | | |
|---|---|---|
| DE | 4400742 | 7/1995 |
| DE | 4418331 A1 | 11/1995 |
| DE | 29802675 U1 | 9/1998 |
| EP | 0 253 588 A1 | 1/1988 |
| EP | 0683348 | 11/1995 |
| EP | 0 823 579 A1 | 2/1998 |
| EP | 04022301 | 1/2005 |
| GB | 2 192 441 A | 1/1988 |
| GB | 2 150 050 A | 11/1993 |
| GB | 2 320 076 | 12/1996 |
| WO | WO 01/61236 A1 | 8/2001 |
| WO | WO 01/61236 A2 | 8/2001 |

* cited by examiner

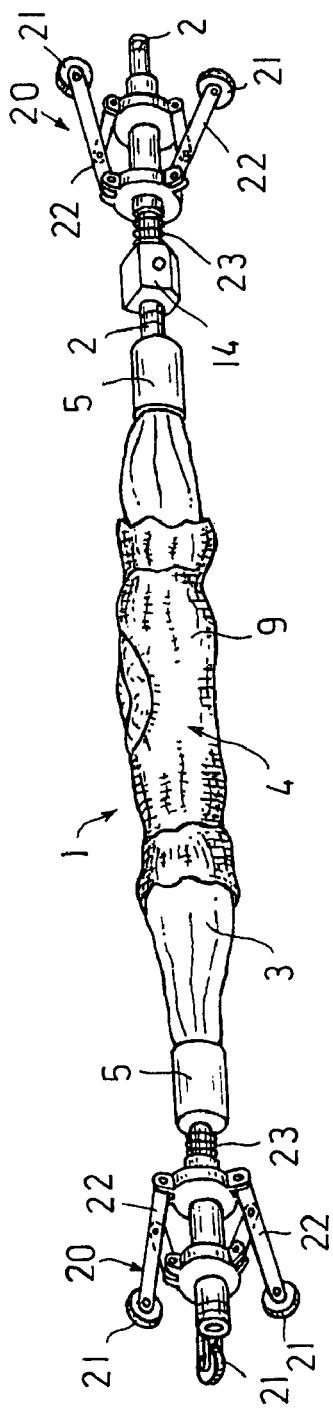
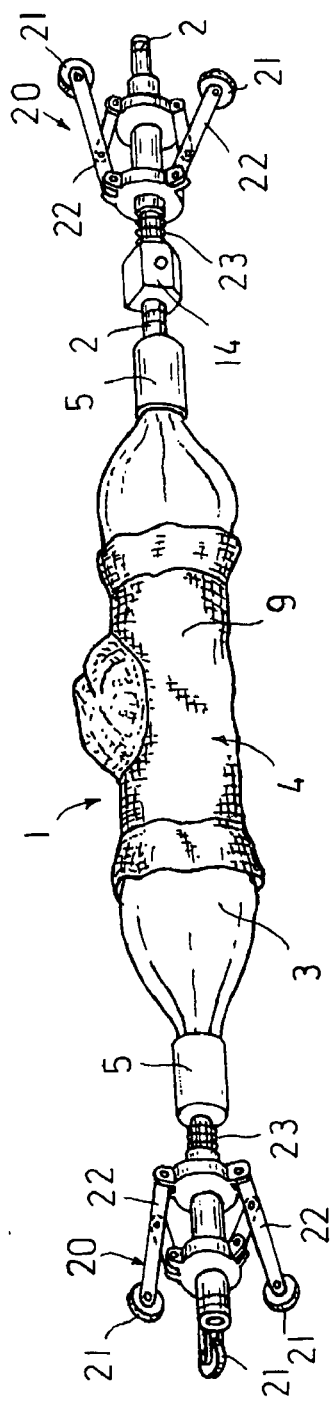
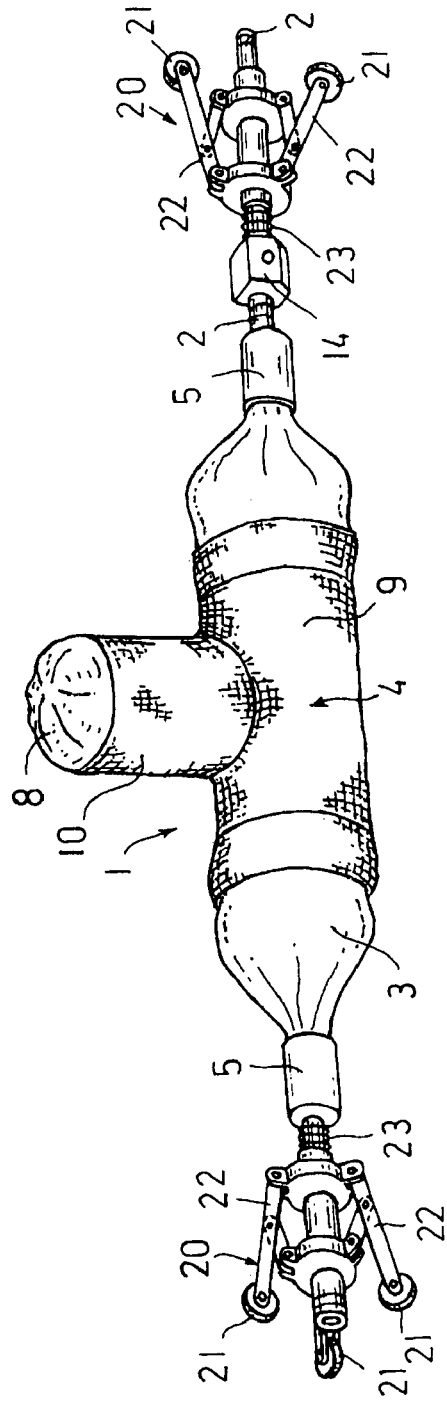

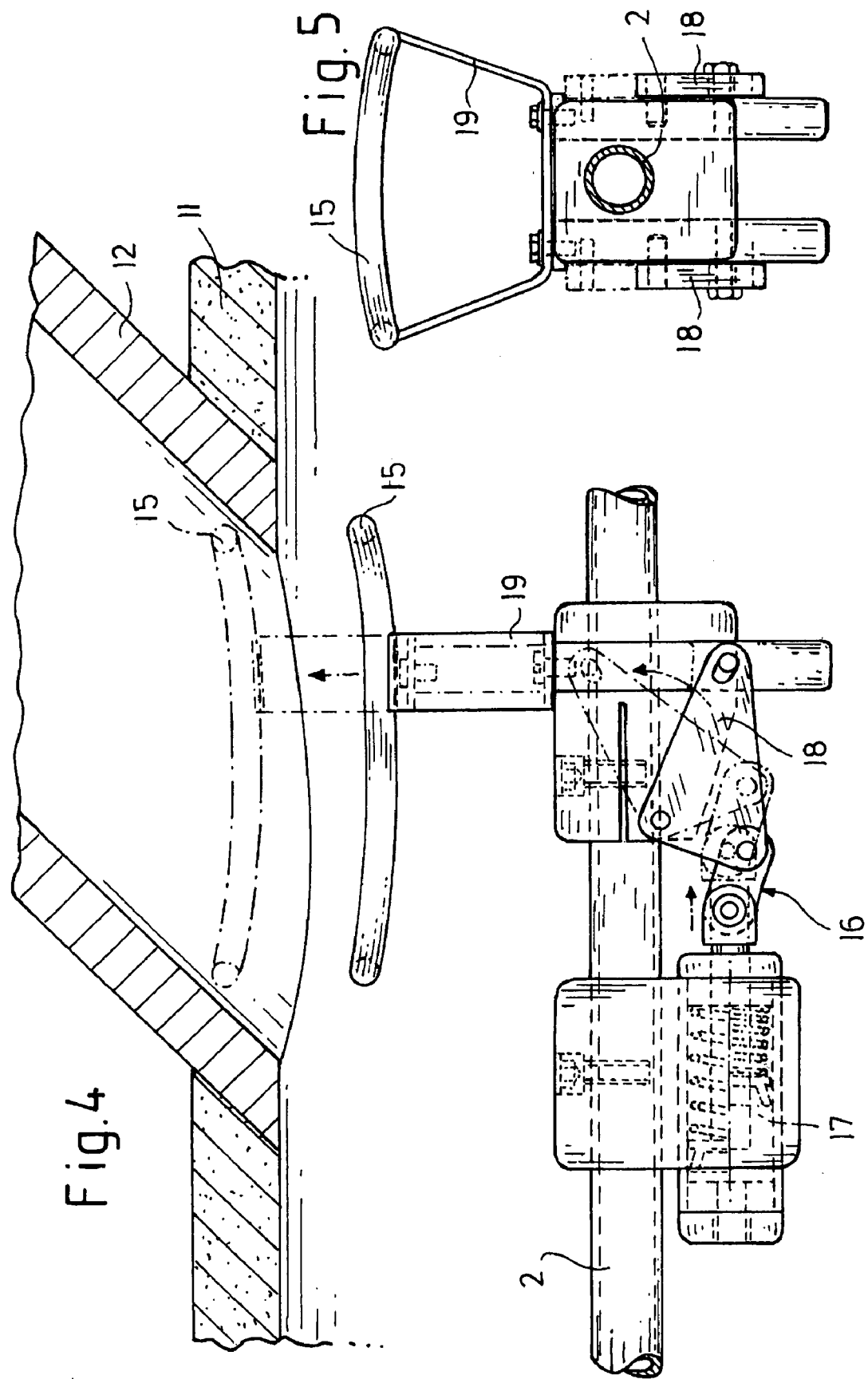

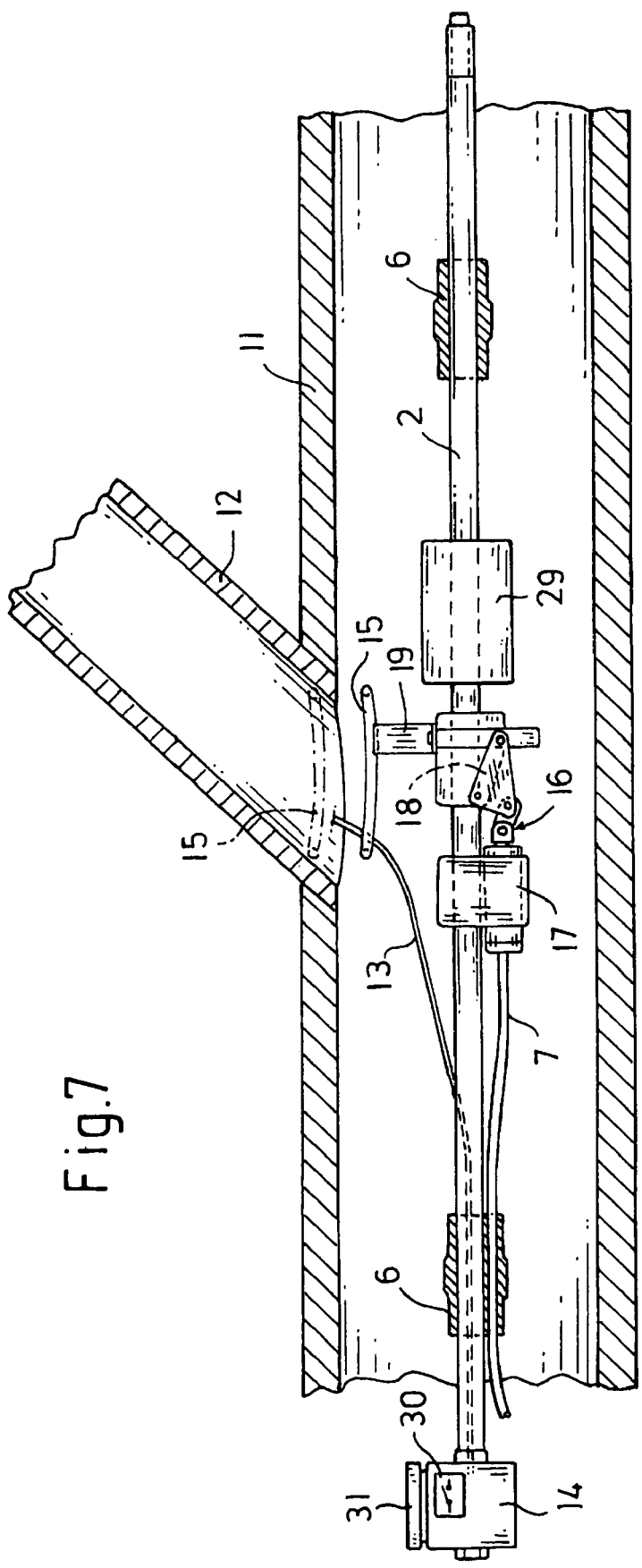

DEVICE AND METHOD FOR PIPELINE REHABILITATION

BACKGROUND OF THE INVENTION

1. Field of the Invention

The present invention pertains to a device and method for pipeline rehabilitation. More specifically, it pertains to a device and method for rehabilitating the junction of a main pipeline and a building service line.

2. Description of Prior Art

A device for rehabilitating pipe joints is known, for which the positioning means is formed by a shield, the outer contours of which are adapted to the inner contours of the main sewer line in the region of the junction opening, so that it can be pressed against the region of the main sewer line that surrounds the junction opening by means of an extension arm. The extension arm is part of a transport unit, which can move in the main sewer line. The shield is moved in the main sewer line by means of the transport unit and is pressed against the main sewer line by means of the extension arm when it reaches the junction region. There is an outlet opening in the shield through which a lining hose can be passed. For placing the lining hose in the connecting branch of the building service line connecting to the junction opening, the lining hose initially located underneath the shield is charged with compressed air. A tight calibration hose is arranged within the lining hose, which presses the lining hose against the pipe wall of the building service line. The lining hose consists of textile material, which is provided with a curable resin. After the resin cures, the calibration hose, shield, and transport unit are removed, so that a T-shaped pipe wall lines and covers the building service line in the region of its junction and also the section of the pipe wall of the main sewer line surrounding the junction.

A similar device is also known in which the positioning means is called a packer. The packer has a rubber jacket, which is arranged around a carrier pipe and which can be inflated to the diameter of the main line. There is an opening in the carrier pipe and the rubber jacket, which is arranged to correspond with the junction of the building service line. On the rubber jacket, a curable pipe lining is attached, such that a cylindrical hose part within the carrier pipe is arranged underneath the opening. Feeding compressed air into the packer, on the one hand, inflates the rubber jacket until it makes tight contact against the main line, and, on the other hand, moves a rubber cylinder formed on the rubber jacket into the region of the opening through the opening out of the carrier pipe outwards into the building service line and in this way turns the hose part of the lining outwards, so that it is pressed tight against the inner wall of the building service line. After the lining cures, the air is suctioned out of the packer, whereby the cylinder on the rubber jacket is drawn again through the opening into the carrier pipe. The packer can then be removed.

The transporting of such devices through the main line to the junction region of the building service line has proven to be problematic in known devices. In particular, the alignment of the hose-shaped part of the lining to the junction of the building service line is difficult. By shifting this hose-shaped lining section a few centimeters in the axial direction of the main line or by rotating the packer a few degrees, the hose-shaped cylindrical section of the pipe lining is not reliably inverted in the building service line. Deformations can occur, which are made permanent by the curing of this hose-shaped cylindrical section and which lead to an unsealed pipe lining.

The object of the present invention is to provide a device and method for rehabilitating pipe connections, which simplify the reliable transport and positioning of the pipe lining in the junction region of the building service line to be lined.

SUMMARY OF THE INVENTION

The present invention provides a device that includes an alignment body, which is arranged so that it can move on the transport means and which can be moved into the junction of the building service line, wherein there is a drive for moving the alignment body into the junction of the building service line.

According to the present invention, the alignment body of the device can be moved into the junction of the building service line before the final positioning of the pipe lining. Here, it should have at least point-wise or linear contact with the wall of the building service line in the region of its junction, so that the pipe lining is aligned exactly with the axis of the building service line. For this purpose, in one practical embodiment the alignment body has contours which are formed complementarily to the inner contours of the building service line in its junction region. However, the alignment body can also be conical, so that it centers itself when it is pushed into the building service line. Furthermore, it can have spring-mounted or telescoping contact fingers, which guarantee a centered arrangement of the alignment body within the building service line.

In one practical embodiment, the alignment body is formed by a ring. Similar to the lining methods known in the art, the pipe lining can have a flexible support material, especially textile material, which is provided with a curable resin. The pipe lining can further have a hose-like cylindrical section, which can be inserted into the junction of the building service line. In practice, this hose-like cylindrical section can surround the annular alignment body on the outside, if the alignment body is pushed into the junction of the building service line.

As is known in the art, the positioning means preferably consists of an inflatable sleeve, which has a connecting hose, which presses the cylindrical section of the pipe lining against the wall of the building service line in the inflated state. In the practical embodiment just described, in which the cylindrical section of the pipe lining surrounds the annular alignment body when it is pushed into the junction of the building service line, it is advantageous to arrange the connecting hose of the inflatable sleeve between the cylindrical section of the pipe lining and the ring. In other words, the hose-like cylindrical section of the pipe lining is pulled through the annular alignment body together with the connecting hose of the inflatable sleeve into the interior of the sleeve, before the annular alignment body is moved into the junction region of the building service line. In this way, the region of the bonding or connection of the connecting hose with the adjacent region of the inflatable sleeve, which essentially assumes the contours of the main line in the inflated state, contacts the ring. The same applies for the region of the bonding of the hose-like cylindrical section in the adjacent region of the pipe lining, which is used for lining the main line. Thus, the alignment body places the critical region of the transition of the T-shaped pipe connection, that is, of the transition between the building service line and the main line in the region of the junction of the building service line, in direct contact with the section of the lining provided for this transition region by insertion of the ring. During the subsequent positioning of the lining for curing in the junction region, it is ensured that both the critical transition region and also the adjacent regions of the lining contact their intended positions in the transition region between the building service line and the main line.

In an alternative embodiment, the alignment body can be formed by the connecting hose of the sleeve itself. The connecting hose of the sleeve should be surrounded by the hose-like cylindrical section of the lining. In other words, the sleeve is partially inflated so that the connecting hose and the cylindrical section surrounding this hose are partially turned out. For this partially turned out connecting hose with the cylindrical section, the positioning device can then still be pushed until the connecting hose with the cylindrical section completely engages in the pipe junction. Here, increased friction based on the partially inflated sleeve is to be taken into account. With an alignment body formed by a separate, solid body, there is only minimal friction.

In one practical embodiment, the device has spring means, which presses the alignment body elastically into the junction of the building service line. This spring means is especially helpful when the alignment body is not exactly aligned with the junction of the building service line. In this case, the alignment body makes elastic contact against the wall of the main line. If the shifting equals only a few millimeters and a diagonal section of the alignment body contacts the edge in the junction region of the building service line, the alignment body slips into the junction of the building service line due to the elastic contact force. If there is a greater mismatch between the alignment body and the junction, it is possible to shift or to rotate the entire device manually or by means of drive means in the axial direction until an exact alignment is realized. Here, it is not necessary to be able to see the junction region of the building service line. By means of the elastic contact of the alignment body in the direction of the junction, it is pressed into the junction of the building service line with exact alignment, so that then no further axial shift or rotation of the device is possible. This locking signals to the operator that the correct alignment has been reached.

The spring means can be formed by an elastic suspension of the alignment body. It can also be formed by an elastic chassis of the entire device. Finally, the alignment body itself can be configured to be resilient, for example, if the connecting hose blown in with a slight excess pressure acts as an alignment body.

As is known in the art, the device according to the present invention can be formed as a packer. The inflatable sleeve forms an expandable packer hose, which is reversible, that is, it can be turned inside out and outside in. The packer hose has approximately the size and shape of the pipe section to be rehabilitated. It preferably consists of a main section, which is arranged around the packer and which essentially has the diameter of the main line. It further consists of a cylindrical section, which is connected to the main section and which essentially has the diameter of the building service line. In practice, the cylindrical section can have the same angle to the main section of the packer hose as the building service line to the main line. With the aid of a lifting device and the alignment means arranged on this device, the bonding of the packer hose to the connecting hose, that is, the transition region between the packer hose and the connecting hose, can be pushed into the junction of the hose service line. In this practical embodiment, the pipe lining consists of a support material provided with a curable resin and is also called an LCR liner. The pipe lining surrounding the packer hose is positioned by pushing the transition between the connecting hose and the packer hose into the junction of the hose service line. By inflating the packer hose with the connecting hose, the pipe lining, which surrounds the packer hose and the connecting hose, is pressed against the pipe section to be rehabilitated.

The inflatable sleeve, that is, the packer hose of the device according to the present invention, can have at least one of the following features:
  it consists of a textile fabric coated with silicon,
  it is underdimensioned relative to the pipe section to be rehabilitated,
  the connecting hose of the packer hose is attached to the section of the packer hose filling the main line corresponding to the angle of the building connection, preferably at an angle of 45° to 90°.

The connecting hose can be a separate part, which is firmly attached to the packer hose. Alternatively, it can be formed by a section integrally attached to the packer hose.

The device, which is also called a packer in the following, rehabilitates the junction region of the building connection in the main pipeline in that a short liner is set in the junction region as pipe lining and simultaneously a defined length projects into the building connection, so that this length is rehabilitated. For this purpose, a previously formed, expandable hose (inflatable sleeve) is used to impart the shape. This hose, which is in the form of a cylinder (packer hose) for the main line, also has a cylindrical section (connecting hose), which is generally arranged in the center and which is arranged at an angle of 45° or 90° to the side surface of the packer hose.

The lateral connecting hose is re-reversed, that is, turned over into the packer hose, before the rehabilitation in the packer hose together with the liner (lining), which essentially has the same shape as the mold. The air in the packer hose and connecting hose is suctioned. Therefore, a low pressure is formed and both the packer hose and the liner, which surrounds the packer hose, form a tight connection with the device. In this way, the liner on the device is secured against slipping.

The liner has a coating on the inside and is thus water-tight.

The device is pushed with locking air slide rods to the damaged position. The air slide rods are used, on the one hand, for supplying compressed air and also for suctioning the air, and on the other hand, for moving the device. Two telescope-like wheel systems (chassis) are mounted on the device. The device can be shifted and rotated by the wheel systems in the main line. By means of the air slide rods, the device is shifted or rotated to the damaged position and in this way optimally aligned with the building service line. For the positioning, a camera can be mounted on the device, which enables the alignment of the device with the junction of the building service line to be recognized.

The packer has a packer rod. For positioning, a lifting mechanism with a compressed-air cylinder is mounted on the packer rod, which can push the ring into the junction region of the building service line. This ring lies under the packer hose directly at the bonding of the packer hose to the connecting hose. The junction of the building service line to the main pipeline is located with the aid of the camera. However, to be able to perform definite positioning, the lifting mechanism is controlled from outside the pipe by means of a control panel, and this moves the ring into the junction. However, if the junction region is not found, the rehabilitation device can be shifted and rotated until the ring moves into the junction region.

After positioning, the packer hose is inflated and, offset or delayed in time, the connecting hose with the liner is reversed, that is, turned over, in the building connection. The time delayed reversal is achieved by a high-strength cord, which is guided and braked in a winding box. After the curing of the liner, the air is suctioned from the device and the ring is moved back. The device can now be removed from the rehabilitated damaged position.

The present invention also relates to a device for rehabilitating pipe connections, which is characterized in that the drive motor for the transport means for transporting the positioning means is a pneumatic motor.

All of the previously known devices use electromotors, typically servomotors, for moving within the main line. Such electromotors require power-supply lines for electrical energy. In addition, electric motors can be the source of sparks. Methane-bearing, and thus combustible, gases are frequently produced in wastewater pipes. Sparks increase the risk of fire or an explosion within the wastewater channels or wastewater pipes to be rehabilitated. For this reason, the invention proposes to use a pneumatic motor as the drive motor. Pneumatic motors are known in a wide variety of constructions. For example, as piston motors, they can have pistons that move in the axial direction, similar to an internal combustion engine, and that can generate drive torque by means of a crankshaft. The pistons run in cylinders, to which compressed air is supplied at certain times by means of valves. Also, pneumatic motors with several pistons arranged in an annular area are known, wherein the connecting rods of the pistons act on a swash plate. Here the air supply to the pistons is realized by means of piston ports. Finally, pneumatic motors with rotary pistons or turbine-like rotor disks are known. The device already provides a pressurized line for inflating the inflatable sleeve. This pressurized line can be used simultaneously as a supply for the operating medium of the pneumatic motor.

Furthermore, a practical embodiment of the invention can have a heating device for heating the curable pipe lining. Heating reduces the time for curing or setting the curable resin. The heating device can be formed, for example, by an electric heating coil.

The method according to the present invention is achieved by pushing an alignment body into the junction of the building service line before the final positioning of the pipe lining, whereby it is ensured that the device according to the invention is located in its predetermined position within the main line.

As explained above, the alignment body can be pressed elastically in the direction of the junction of the building service line during the insertion. If the alignment body is not aligned exactly with the junction of the building service line, it makes contact under elastic stress against a wall section of the main line. By slight shifting or rotation, the alignment body can be aligned with the junction of the building service line, wherein the elastic pre-tensioning force of the alignment body presses into the building service line.

As explained above, in one practical embodiment a ring can be used as the alignment body. The positioning means can be an inflatable sleeve, which presses a pipe lining made from a support material provided with curable resin against a pipe section to be rehabilitated. A cylindrical section of the pipe lining is pressed by a connecting hose of the inflatable sleeve into the junction of the building service line. During the transport of the pipe lining through the main line and before insertion of the annular alignment body, the connecting hose of the sleeve can be inverted into the interior of the sleeve together with the cylindrical section of the pipe lining by the annular alignment body. During transport of the sleeve through the main line to the pipe junction, the air can be suctioned from the sleeve. In this way, the sleeve lies tight against the device and is secured against slipping.

The critical region of the pipe lining is the region of the connection between the cylindrical section of the lining and the section of the pipe lining used for the lining of the main line. This binding region is located at the lower end of the cylindrical section. In one practical embodiment of the method, the binding region is pressed by means of the alignment body against the junction of the building service line. The alignment body contacts the binding region from the inside.

In one practical embodiment of the method, after the pipe lining cures, the alignment body is moved away from the aforementioned junction and the air is bled or suctioned out of the inflatable sleeve.

The positioning means for the pipe lining, which is formed especially by the packer, can be shifted and rotated by means of connected rods during the positioning in the main line. The positioning means can be guided during shifting and rotation by means of a chassis with telescope-like wheel systems.

According to a practical embodiment of the method, a cord running in the interior of the connecting hose is attached at the end of the connecting hose of the sleeve. The cord is used for drawing back the connecting hose. With the aid of the cord, with the slight excess pressure in the connecting hose, the connecting hose, together with the cylindrical section of the pipe lining, can be pulled through the annular alignment body into the inflatable sleeve. The excess pressure in the connecting hose tightly compresses the section of the connecting hose turned inwards. The end of the cylindrical section of the lining, can be stopped in the inside-out region, that is, the end section of the connecting hose pressed together tightly within the connecting hose. The pressure within the connecting hose clamps the end of the cylindrical section. During the further drawing back of the connecting hose, the end of the cylindrical section is entrained and the cylindrical section is turned from its outside projecting position inside into the inflatable sleeve.

BRIEF DESCRIPTION OF THE DRAWINGS

The present invention will be more fully understood and appreciated by reading the following Detailed Description in conjunction with the accompanying drawings, in which:

FIG. 1 is a graphical representation of a device according to the invention with evacuated packer hose;

FIG. 2 is a representation corresponding to FIG. 1 with partially air-filled packer hose and lifted alignment body;

FIG. 3 is a representation corresponding to FIGS. 1 and 2 with completely inflated packer hose;

FIG. 4 is a side view of a drive for the alignment body;

FIG. 5 is a front view of the drive from FIG. 4;

FIG. 7 is a side view of an embodiment of the rods of the packer without packer hose, pipe lining, and chassis;

FIG. 8 is a top view of the annular alignment body of the packer from FIG. 7.

DETAILED DESCRIPTION

Figure 6:
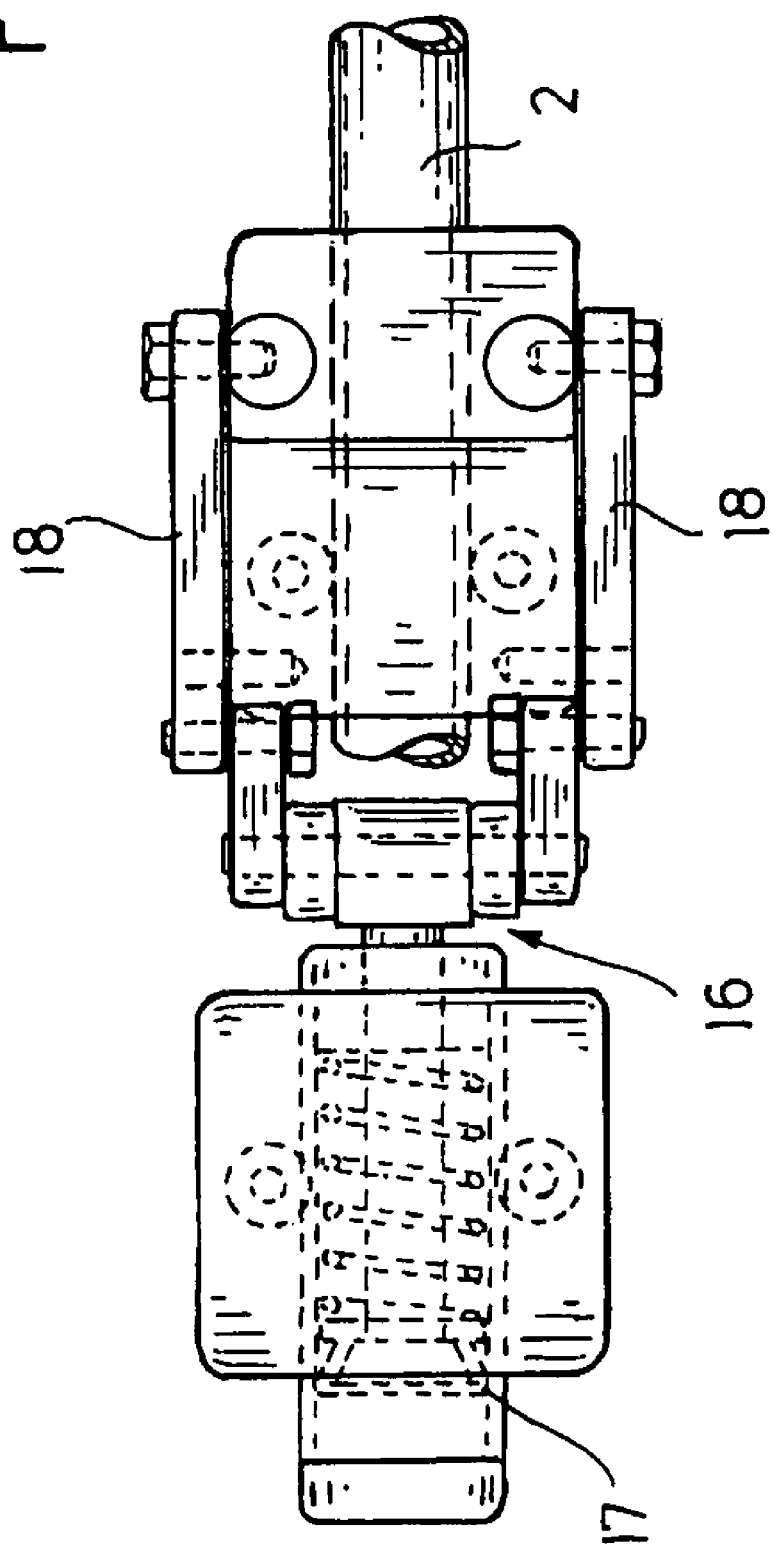
FIG. 6 is a bottom view of the drive from FIG. 4.

Referring now to the drawings, wherein like reference numerals refer to like parts throughout, there is seen in FIGS. 1-3 a packer 1 essentially consisting of a rigid packer rod 2, onto which the packer hose 3 and a flexible pipe lining 4 are pushed. Each of the two ends of the packer hose 3 is tensioned with a tensioning collar 5 around a cylindrical connection head 6 (cf. FIG. 7), so that an airtight connection is produced.

The connection heads 6 are connected on their side rigidly and airtight to the packer rod 2. The connection head 6 shown on the left in FIG. 7 also receives a pressure line 7.

Furthermore, a connecting hose 8 is attached to the packer hose 3. This connecting hose has an angle to the packer hose 3 that corresponds to the angle between a building service line and a main line, which is to be rehabilitated in the junction region. In the FIGS. 1-3 this angle equals 90°. For rehabilitating the pipe connection shown in FIG. 7 the angle must equal 45°.

The pipe lining 4, which is formed with a T-shape, is pushed onto the packer hose 3. It consists of a main section 9 and a cylindrical section 10, which forms an angle of 90° with the main section 9 in the FIGS. 1-3. The main section 9 of the lining 4 extends parallel to the packer rod 2 and for an inflated packer hose 3 has essentially the same diameter as the main line 11 to be rehabilitated (like FIG. 7). The cylindrical section 10 has a diameter corresponding to the building service line 12.

The packer hose 3 forms together with its connecting hose 8 an inflatable sleeve for positioning the lining 4 in the junction region of the building service line 12 to be rehabilitated (FIG. 7) in the main line 11.

In FIG. 1, the packer 1 is shown in the evacuated state. For this purpose, air is suctioned from the inflatable sleeve consisting of packer hose 3 and connecting hose 8 by means of the pressure line 7. The end of the connecting hose 8 is closed and held by a cord 13 (FIG. 7), which can be guided by the packer rod 2 into a winding box 14 and there can be wound. To reach the evacuated state of FIG. 1, initially the packer hose 3 and the lining 4 are arranged on the packer rod 2 and the packer hose 3 is inflated until the arrangement shown in FIG. 3 is reached. The lining 4 consists of textile material and is impregnated with a curable resin in the inflated state. Then the cord 13 is wound into the winding box. As can be seen in FIG. 7, the cord 13 runs through an annular alignment body 15. The connecting hose 8 is pulled with the cord 13 through the ring 15 into the interior of the packer hose 3. Here, a slight excess pressure remains within the packer hose 3. The upper end of the cylindrical section 10 of the pipe lining 4 is stopped in the region of the reversal of the pulled back connecting hose 8 and is clamped tight for further pulling back of the connecting hose with the cord 13 in the region of the reversal and pulled into the interior of the packer hose 3. After complete pulling back of the cord 13 the air is suctioned from the packer hose 3 to achieve the evacuated state shown in FIG. 1.

The winding box may 14 further comprise a micro-switch that is actuated when the cord 13 has been completely pulled out of the winding box 14. The micro-switch triggers a signaling means that indicates to the operator the complete extension of the connecting hose 8 and thus the complete insertion of the cylindrical section 10 into the building service line 12. Any appropriate signaling means can be used such as a signaling light on the control panel for operating the packer or a whistle to be operated with pneumatic pressure, e.g. drawn from a pneumatic cylinder 17 of a lifting mechanism (see below). An acoustic signal produced by a whistle carries through the sewer system where the packer is used.

As can be seen especially in FIGS. 4-7, the annular alignment body 15 is fixed to the packer rod 2 by a lifting mechanism 16. The lifting mechanism 16 has a pneumatic cylinder 17 and on both sides of the packer rod 2 an articulated lever 18. A support frame 19, which carries the ring 15, is fixed to the free ends of the articulated lever 18. When the pneumatic cylinder 17 is charged with pressure, the ring 15 is moved upwards by the lifting mechanism 16 and assumes the position shown in FIG. 4 with dash-dot lines. The upper position of the ring 15 is shown in FIG. 7 in thin lines. In this upper position, the ring 15 is located in the junction region of the building service line 12. If the ring 15 is used for rehabilitating a building service line 12 opening diagonally into the main line, the outer contours of the ring 15 are formed in an oval corresponding to the inner contours of the junction of the building service line 12 (FIG. 8).

On both ends of the packer rod 2 there are chassis 20. Each chassis 20 consists of three guidance wheels 21, which are connected to the packer rod 2 by means of expandable braces 22. A helical spring 23 presses the braces 22 of each chassis via a common guidance sleeve into the expanded position. In this way, the packer rod 2 is guided elastically and can rotate by means of the chassis 20 essentially in the center of the main line 11.

For attaching a pipe lining 4 the packer is set into the arrangement shown in FIG. 1 with evacuated packer hose 3 into the main line and pushed at the junction region of a building service line 12 into a main line 11 (FIG. 7). In this position the lifting mechanism 16 (FIGS. 1-3) is activated. For this purpose, the pneumatic cylinder 17 is charged with compressed air. Therefore, the ring 15, which is located within the packer hose 3 in the region of the connection between packer hose 3 and connecting hose 8, is pressed upwards into the junction of the building service line 12. If the junction of the building service line 12 is not correctly aligned with the ring 15, this bumps against the wall of the main line 11 by means of the intermediate regions of the packer hose 3 and the lining 4. Here, the elastic chassis 20 is pressed together. In this state, it is possible to shift or rotate the packer 1 within the main line in the axial direction until the ring 15 is led into the junction of the building service line 12. As soon as this has happened, an essentially positive-fit engagement of the ring 15 acting as an alignment body in the junction of the building service line 12 is produced. Consequently, further movement of the packer 1 is no longer possible.

As explained above, the outer side of the rings 15 is surrounded by the connection region between the packer hose 3 and connecting hose 8 (not shown in FIG. 7) or by the connection region between the main section 9 of the lining 4 and its cylindrical section 10. This connection region of the lining 4 is held by the annular alignment body 15 in the end position provided for it in the region of the pipe junction. Compressed air can now be introduced into the packer hose 3 via the pressure line 7, wherein the connecting hose 8 with the cylindrical section 10 is turned outwards, and the shape recognizable in FIG. 3 is achieved. Deviating from the representation in FIG. 3, for a lining of a tube according to FIG. 7 the connecting hose 8 and the cylindrical section 10 must run at an angle of 45° to the packer hose 3 or main section 9 of the division 4.

The inflatable sleeve 3 remains inflated until the lining 4 has cured. Then the air can be suctioned from the inflatable sleeve, consisting of packer hose 3 and connecting hose 8. Finally, the packer 1 can be pulled out with the packer hose 3 from the cured pipe lining 4.

In FIG. 7 the chassis 20 of the packers 1 are not shown for reasons of clarity.

Figure 9:
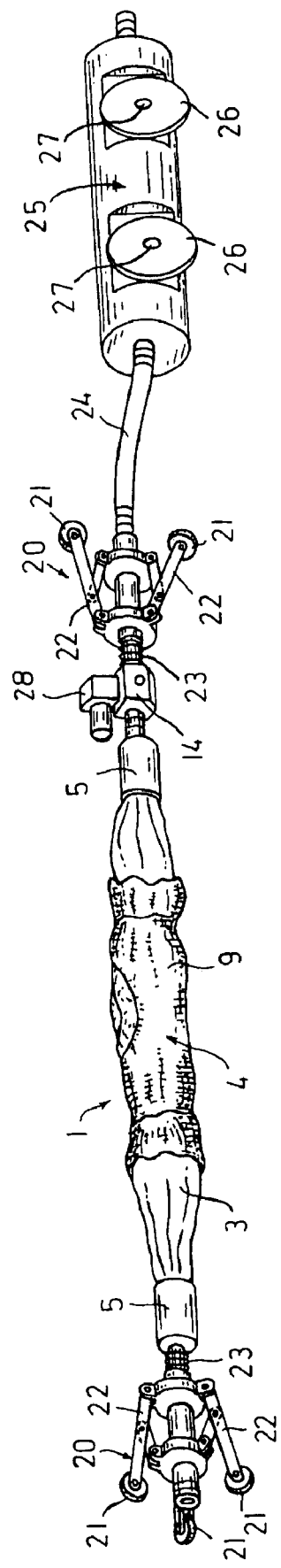
FIG. 9 is a diagram corresponding to FIG. 1 of the packer with motor-driven transport means.

FIG. 9 shows a representation of the packer 1 corresponding to FIG. 1. The packer 1 is connected to a drive motor 25 by means of a bendable but essentially non-compressible or non-expandable hose section 24. Two wheels 26 are arranged on the housing of the drive motor 25 on each side. At least one of the wheel axles 27, which carries a pair of wheels, can be driven by the drive motor 25. The drive motor 25 is a pneumatic motor, preferably a piston motor operated with compressed air. In this way, the drive motor 25 can be supplied with power by means of the same pressure supply that leads compressed air into the interior of the packer hose 3.

In addition, an electronic camera 28 is arranged on the winding box 14 in the embodiment from FIG. 9. The electronic camera 28 preferably has a CCD chip for recording images. It is connected to an optical display device (monitor) either by means of a data line or a radio connection (Blue Tooth, Wireless LAN, or the like). The image of the camera 28 displayed on the screen simplifies the positioning of the packer 1 in the junction region of a building service line 12.

In addition, a light, which illuminates the area recorded by the camera 28, can be arranged next to or behind the camera 28.

Finally, FIG. 7 shows a heater 29 near the ring 15. The heater 29 is preferably formed by an electric heating coil, which is operated by means of an insulating transformer. The transformer can be designed for receiving various input voltages. Such an electrical heating coil is very simple and not very prone to problems.

List of Reference Symbols:
1 Packer
2 Packer rod
3 Packer hose, inflatable sleeve
4 Lining
5 Tensioning collar
6 Connection head
7 Pressure line
8 Connecting hose
9 Main section
10 Cylindrical section
11 Main line
12 Building service line
13 Cord
14 Winding box
15 Ring, annular alignment body
16 Lifting mechanism, drive
17 Pneumatic cylinder
18 Articulated lever
19 Support frame
20 Chassis
21 Guidance wheel
22 Brace
23 Spring
24 Hose section
25 Drive motor
26 Drive wheel
27 Wheel axle
28 Electronic camera
29 Heater While there has been illustrated and described what are at present considered to be preferred and alternate embodiments of the present invention, it should be understood and appreciated that modifications may be made by those skilled in the art, and that the appended claims encompass all such modifications that fall within the full spirit and scope of the present invention.

What is claimed is:

1. A device for rehabilitating pipe connections, comprising:
 a positioning device that positions a curable pipe lining at a junction of a building service line and a main line;
 a transport device that transports the positioning device and the pipe lining to the mentioned junction;
 an alignment body which is arranged so it can move on the transport device and which can be moved into the opening of the building service line;
 a drive for moving the alignment body into the opening of the building service line; and
 a spring that presses the alignment body elastically in the direction of the junction of the building service line allowing for movement of the alignment body until the alignment body is exactly aligned with said junction and locks into the junction.

2. A device according to claim 1, wherein said alignment body comprises a ring.

3. A device according to claim 1, wherein said pipe lining comprises a flexible support material provided with curable resin.

4. A device according to claim 3, wherein said cylindrical section surrounds the ring when it is inserted into the junction of the building service line.

5. A device according to claim 3, wherein said pipe lining comprises a cylindrical section, which can be inserted into the junction of the building service line.

6. A device according to claim 5, wherein said positioning device is an inflatable sleeve, which comprises a connecting hose for pressing said cylindrical section against the interior surface of said building service line in the inflated state.

7. A device according to claim 6, wherein said alignment body is formed by the connecting hose of the sleeve.

8. A device according to claim 6, wherein said inflatable sleeve is a reversible and expandable packer hose having approximately the size and shape of the pipe section to be rehabilitated, said packer hose comprising an attached connecting hose;
 said device further comprising a lifting mechanism wherein said lifting mechanism cooperates with the alignment body to push the union of the packer hose and the connecting hose into the junction of the building service line and main line;
 wherein said pipe lining comprises a support material provided with curable resin; and
 wherein said pipe lining is positioned by the pushing of the lifting mechanism and alignment body; and
 wherein said pipe lining is pressed against the pipe section to be rehabilitated by inflating the packer hose.

9. A device according to claim 8, wherein said packer hose includes a textile fabric coated with silicon.

10. A device according to claim 8, wherein said packer hose is underdimensioned relative to the pipe section to be rehabilitated.

11. A device according to claim 8, wherein the connecting hose of the packer hose is attached to the section of the packer hose filling the main line, at an angle of 45° to 90°.

12. A device according to claim 8, wherein said connecting hose is a section attached to the packer hose.

13. A device according to claim 8, wherein said connecting hose is a part connected firmly to the packer hose.

14. A device according to claim 1, wherein said transport device comprises at least one chassis, further comprising a chassis spring and wheels, wherein said wheels are elastically connected to the transport device by said chassis spring.

15. A device according to claim 1 wherein said transport device comprises a drive motor; and wherein said drive motor is a pneumatic motor.

16. A device according to claim 15, wherein said positioning device is an inflatable sleeve and comprises a pressure line for supplying compressed air for inflating the inflatable sleeve, and wherein the pressure line supplies compressed air for operating the pneumatic motor.

17. A device according to claim 16, further comprising a heating device for heating the curable pipe lining.

18. A device according to claim 17, wherein said heating device comprises an electric heating coil.

19. A device according to claim 1, wherein said positioning device is connected to a detecting device that detects the extended position of the positioning device.

20. A device according to claim 19, wherein said positioning device comprises a connecting hose and said detecting device is a winding box, that comprises a switch and is connected to the connecting hose by a cord.

21. A device according to claim 20, wherein said switch is operatively connected to a signaling device.

22. A method for rehabilitating pipe connections, comprising the steps of:
  transporting a curable pipe lining to a junction of a building service line and a main line;
  inserting an alignment body into said junction;
  positioning said curable pipe lining at said junction; and
  curing said pipe lining;
  wherein the step of inserting an alignment body further comprises the step of using a spring to elastically press said alignment body in the direction of the junction to the building services line allowing for movement of the alignment body until the alignment body is exactly aligned with said junction and locks into the junction.

23. A method according to claim 22, wherein said alignment body comprises a ring.

24. A method according to claim 22, wherein the step of positioning said curable pipe lining is accomplished using an inflatable sleeve, which presses a pipe lining including a flexible support material provided with curable resin, against a pipe section to be rehabilitated, and wherein a cylindrical section of the pipe lining is pressed by said connecting hose of the inflatable sleeve into the junction of the building service line.

25. A method according to claim 24, wherein the step of transporting a curably pipe lining to said pipe junction further comprises the step of generating a low pressure in the inflatable sleeve.

26. A method according to claim 24, wherein the cylindrical section, in the region of its connection to the main section of the pipe lining contacting the main line, is pressed against the junction of the building service line.

27. A method according to claim 24, comprising the step of pulling said connecting hose of the inflatable sleeve together with the cylindrical section of the pipe lining into the interior of the inflatable sleeve before inserting the annular alignment body through these components.

28. A method according to claim 27, further comprising the step of providing a cord, in the interior of the connecting hose and attached at the end of the connecting hose, for pulling back the connecting hose together with the cylindrical section of the pipe lining.

29. A method according to claim 28, further comprising the step of generating an excess pressure in the connecting hose for pulling back the end of the cylindrical section and wherein the end of the cylindrical section is stopped in the reversal region of the connecting hose and is entrained for further pulling back.

30. A method according to claim 22, wherein said alignment body is moved away from said junction after the curing of the pipe lining and air is bled out from an inflatable sleeve.

31. A method according to claim 22, wherein a positioning device is shifted and rotated using connected rods for positioning in the main line.

32. A method according to claim 31, wherein the positioning device is guided using a chassis with telescope-like wheel systems.

\* \* \* \* \*

UNITED STATES PATENT AND TRADEMARK OFFICE
CERTIFICATE OF CORRECTION

| | | |
|---|---|---|
| PATENT NO. | : 7,631,665 B2 | Page 1 of 1 |
| APPLICATION NO. | : 10/947503 | |
| DATED | : December 15, 2009 | |
| INVENTOR(S) | : Michael Mühlin | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 929 days.

Signed and Sealed this

Second Day of November, 2010

David J. Kappos
*Director of the United States Patent and Trademark Office*